United States Patent
Iyer et al.

(10) Patent No.: US 8,295,860 B2
(45) Date of Patent: Oct. 23, 2012

(54) SYSTEM AND METHOD FOR INTELLIGENT PAGING OF AN IDLE MOBILE DEVICE

(75) Inventors: Jayaraman R. Iyer, Sunnyvale, CA (US); Anand K. Oswal, Sunnyvale, CA (US); Michael Lindsay Shannon, San Jose, CA (US); Timothy P. Stammers, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 1030 days.

(21) Appl. No.: 11/685,477

(22) Filed: Mar. 13, 2007

(65) Prior Publication Data

US 2008/0225760 A1 Sep. 18, 2008

(51) Int. Cl.
*H04W 68/00* (2009.01)

(52) U.S. Cl. ............... 455/458; 455/418; 455/343.2; 455/343.3; 455/343.4; 455/515; 455/519; 455/547

(58) Field of Classification Search ............ 455/421, 455/418–420, 519, 515, 574, 343.2–343.5, 455/458
See application file for complete search history.

(56) References Cited

U.S. PATENT DOCUMENTS

| | | | | |
|---|---|---|---|---|
| 5,705,995 A * | 1/1998 | Laflin et al. | ........... | 340/7.48 |
| 5,974,085 A | 10/1999 | Smith | ........... | 375/222 |
| 6,009,319 A * | 12/1999 | Khullar et al. | ........... | 340/7.38 |
| 6,044,282 A | 3/2000 | Hlasny | ........... | 455/574 |
| 6,289,464 B1 * | 9/2001 | Wecker et al. | ........... | 713/300 |
| 6,418,308 B1 * | 7/2002 | Heinonen et al. | ........... | 455/414.3 |
| 6,782,250 B2 | 8/2004 | Rainish et al. | ........... | 455/343.2 |
| 6,973,310 B2 | 12/2005 | Neufeld | ........... | 455/436 |
| 7,197,323 B2 * | 3/2007 | Terry | ........... | 455/458 |
| 7,228,134 B2 * | 6/2007 | Gandhi et al. | ........... | 455/434 |
| 7,474,900 B2 * | 1/2009 | Rossetti | ........... | 455/458 |
| 2004/0043798 A1 * | 3/2004 | Amerga et al. | ........... | 455/574 |

* cited by examiner

Primary Examiner — Steve D Agosta
(74) Attorney, Agent, or Firm — Baker Botts L.L.P.

(57) ABSTRACT

An access gateway comprises a processor. The processor is operable to determine a message type of a received packet. The processor is further operable to apply a paging rule. The paging rule is related at least in part to the message type of the received packet. The processor is further operable to determine whether to send a request to transition the mobile device to an active state based on the paging rule. The processor is further operable to send a request, when appropriate, to transition the mobile device to an active state.

18 Claims, 4 Drawing Sheets

| | 210 | 220a | 220b | 220c | 220d | 220e | | 230 |
|---|---|---|---|---|---|---|---|---|
| | IDENTIFIER | MESSAGE TYPE | TIME SENT | SENDER | PRIORITY | MAX BUFFER | ... | ACTION |
| 200a → | 207.142.131.235 | SMTP | <1601 | SUPERVISOR@ MYJOB.COM | - | - | ... | ACTIVATE-TRANSMIT |
| 200b → | 207.142.131.235 | SMTP | - | MYJOB.COM | HIGH | - | ... | ACTIVATE-TRANSMIT |
| 200c → | 207.142.131.235 | SMTP | >1600 | - | LOW | - | ... | IDLE-BUFFER |
| 200d → | 207.142.131.235 | SMS | - | MYJOB.COM | - | - | ... | ACTIVATE-DISCARD |
| 200e → | 207.142.131.235 | IRC | <1700 | - | - | - | ... | IDLE-DISCARD |
| 200f → | 207.142.131.222 | - | <1830 | - | - | 15 | ... | ACTIVATE-TRANSMIT |
| 200g → | 207.142.131.222 | SMTP | - | - | - | - | ... | IDLE-BUFFER |
| | ... | ... | ... | ... | ... | ... | ... | ... |

*FIG. 2*

| MESSAGE TYPE | TIME SENT | PRIORITY | MAX BUFFER | ... | ACTION |
|---|---|---|---|---|---|
| SMTP | - | NORMAL | - | ... | IDLE-BUFFER |
| SIP | - | - | - | ... | ACTIVATE-DISCARD |
| SMS | - | - | - | ... | IDLE-BUFFER |
| IRC | - | - | - | ... | ACTIVATE-TRANSMIT |
| - | - | - | 100 | ... | ACTIVATE-TRANSMIT |
| SMTP | - | HIGH | - | ... | ACTIVATE-TRANSMIT |

SYSTEM AND METHOD FOR INTELLIGENT PAGING OF AN IDLE MOBILE DEVICE

TECHNICAL FIELD OF THE INVENTION

This invention relates in general to the field of wireless packet-based network communications and more particularly to a system and a method for intelligent paging of an idle mobile device.

BACKGROUND OF THE INVENTION

Typically, mobile devices have an idle state to which they transition to preserve battery life when they are not in use. In order to receive incoming messages, base stations regularly send requests to mobile devices for them to become active to receive the incoming messages. Messages are sent indiscriminately by base stations without regard to the message's importance to the end user. As a result, mobile devices regularly become active even when the message does not require the end user's immediate attention or even when the end user would prefer to wholly ignore the message. Therefore, the amount of time a mobile device spends in idle mode is unnecessarily reduced by low priority messages. As a result, the battery life of the mobile device is reduced unnecessarily. Moreover, the wireless network's performance is reduced by unnecessarily sending a discrete communication for every incoming message no matter its importance.

SUMMARY OF THE INVENTION

In accordance with the present invention, the disadvantages and problems associated with traditional paging of idle mobile devices have been substantially reduced or eliminated.

In one embodiment, the system comprises a processor operable to determine characteristics of a message destined for a mobile device in an idle state. The system retrieves and applies a rule that is related at least in part to the message's characteristics. The system uses the rule to determine whether to send a request to transition the mobile device to an active state, and, when appropriate, sends the request to transition the mobile device to an active state.

The invention has important technical advantages. Various embodiments of the invention may have none, some, or all of these advantages. One advantage of the present invention is that it conserves the battery life of mobile devices having an idle mode. By selectively determining when to page a mobile device into an active state, the system reduces the number of times the mobile device transitions to an active state. As a result, the battery life of the mobile device is increased. Furthermore, the number of discrete messages sent to mobile devices is decreased resulting in lower wireless network traffic.

Other technical advantages of the present invention will be readily apparent to one skilled in the art from the description and the appended claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIG. 2 illustrates one embodiment of user profiles used in the system of FIG. 1;

FIG. 3 illustrates one embodiment of default rules used in the system of FIG. 1.

DETAILED DESCRIPTION OF THE INVENTION

Figure 1:
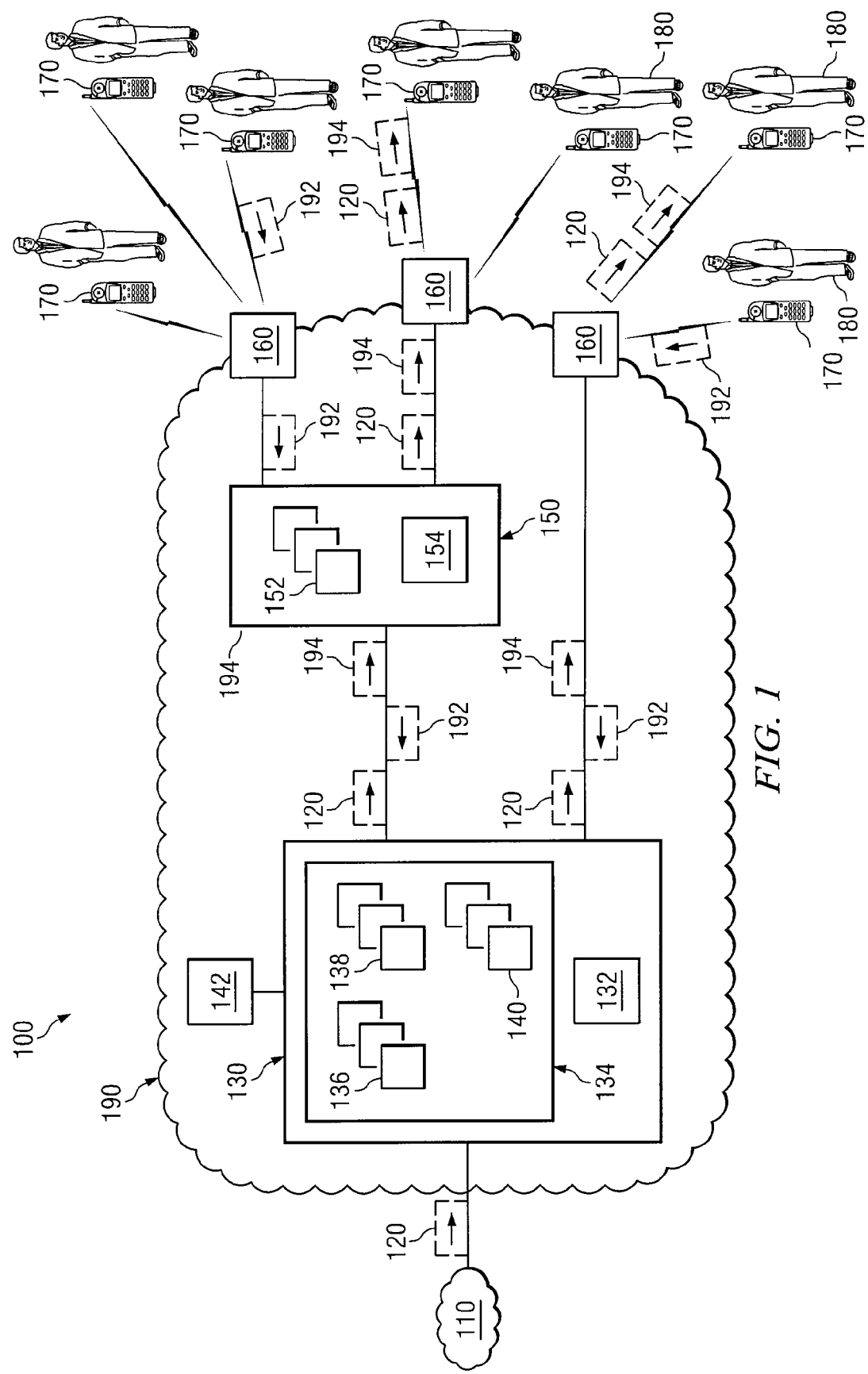
FIG. 1 is a simplified block diagram of a packet-based communications system for providing intelligent paging of mobile devices, in accordance with one embodiment of the present invention.

FIG. 1 is a block diagram of an intelligent paging system 100 that includes a packet switched network 110, and a wireless network 190 comprising an access gateway 130, base stations 160, and mobile devices 170. Generally, system 100 receives and inspects a message 120, which is destined for a user 180 of a particular mobile device 170. Based on the characteristics of message 120 and the preferences of user 180, system 100 determines whether to activate an associated idle mobile device 170. As a result, mobile device 170 remains in an idle state unless otherwise activated. With mobile devices 170 activated less frequently, system 100 may produce a significant improvement in the battery life of mobile devices 170. Additionally, the number of discrete transmissions of messages 120 to mobile devices 170 decreases, thus potentially reducing the network traffic of wireless network 190.

Packet switched network 110 is a series of points or nodes of interconnected communication paths for receiving and transmitting packets of information that propagate through system 100. Examples include the Internet, any wide area network (WAN), metropolitan area network (MAN), virtual private network (VPN), intranet, local area network (LAN), and roaming network. Network 110 implements the transmission control protocol/internet protocol (TCP/IP) communication language protocol in a particular embodiment of the present invention. However, network 110 may alternatively implement any other suitable communications protocol for transmitting and receiving messages 120 within system 100.

Generally, a message 120 is comprised of one or more packets sent over a packet switched network 110, with each packet containing routing information and data. The data associated with a particular message 120 sometimes may be included in a single packet, and other times may be divided among a plurality of packets. This broad definition of message 120 includes messages 120 sent by the various Internet protocols and includes messages 120 as viewed at different layers of the protocol. For example, one message 120 may be a TCP SYN message when viewed at the transport layer and another message 120 may be a complete electronic mail (e-mail) message when viewed at the application level.

To illustrate further, suppose an application residing on one network 110 node sends a message 120 to an application residing on another network 110 node. To facilitate the node to node communications, the application protocol may divide message 120 into one or more packets. The network layer protocol of network 110 may also further divide message 120 into smaller packets for efficient communication of the message 120 through the network 110. Each packet contains part of the message 120 along with address and routing information. Suppose further that the application layer protocol is Simple Mail Transfer Protocol (SMTP). The application residing on the first network node attempts to establish a TCP connection. To establish the connection, a TCP SYN message, a type of message 120, will be sent. After a three-way handshake is completed establishing the connection, the higher-level protocol, SMTP, may send an e-mail message, which is also a type of message 120.

Depending upon the structure of network 110, a packet may conform to one of several network layer protocols, such as Internet Protocol (IP), which is utilized widely in the Internet, or IP version 6 (IPv6). Messages 120 may also conform to one of several transport layer protocols and one of several application layer protocols. The protocol used to transmit a message 120 determines that message's type. Examples of the types of messages 120 include: TCP/IP packets, SMTP messages or Post Office Protocol (POP) messages used to send electronic mail (E-mail); Session Initiation Protocol (SIP) used for voice over IP (VoIP); Internet Relay Chat (IRC) messages used for instant messages; Short Message Service (SMS) used to send text messages; Multimedia Messaging Service (MMS) messages used for multimedia messages; or any other types of messages sent using one of a myriad of Internet protocols. There are a host of other types of messages 120 sent over packet-based networks 110. The term "message," albeit in its singular form, is meant to encompass one or more related packets that encode a single message 120. Thus, when system 100 is described as operating on a message 120, it may be considered to operate on one or more related packets that compose the message 120.

Access gateway 130 is a device capable of receiving and inspecting a message 120 and includes a processor 132, and a memory 134 that stores user profiles 136, default rules 138, and a queue 140. In some embodiments, processor 132 may be an application specific integrated circuit (ASIC) hard-coded with default rules 138. In one embodiment, access gateway 130 downloads user profiles 136 for a particular mobile device 170 from an authentication, authorization, and accounting (AAA) server 142 when the particular mobile device 170 registers with access gateway 130. As discussed in detail below, access gateway 130 may use the characteristics of a particular message 120, user profiles 136, and default rules 138 to determine whether to activate a particular mobile device 170 and/or whether to buffer message 120. In certain embodiments, access gateway 130 uses an activation request 194 to activate mobile device 170. Application proxies, such as Proxy-CSCF (Call State Control Function) servers used in the IP Multimedia Subsystem (IMS), may be used to handle certain application protocols, such as SIP. Access gateways 130 may be configured to host one or more application proxies.

User profiles 136 comprise a user specific data structure containing one or more preferences associated with a particular user 180. User profiles 136 may comprise information related to authorization, access, and accounting functions. In addition, the preferences stored in user profiles 136 may include paging rules. Paging rules are pre-defined criteria based on one or more characteristics of a message 120 used to determine whether to activate a particular mobile device 170 when a message 120 destined for that mobile device 170 is received from network 110. Generally, the paging rules stored in user profiles 136 may comprise: information related to the identities of one or more mobile devices 170; criteria to determine whether a particular paging rule applies; and the actions performed if the particular paging rule applies. The identities are unique identifiers of the various mobile devices, such as a MAC address. Criteria may be based on any number and combination of characteristics of message 120, such as: the message type, which, as explained above, could be SMTP, SIP, SMS, TCP/IP, or any other type of message 120; the time sent; the sender; the message priority as assigned by the sender; and the number of low-priority messages 120 stored before transmitting to mobile device 170. Two types of actions are performed in response to receiving a message 120. First, the system 100 may activate the mobile device 170 or allow the mobile device 170 to remain idle. Second, the system 100 may buffer the message 120 or discard the message 120.

Four combinations of these two types of actions exist: activate-transmit; activate-discard; idle-buffer; and idle-discard. Based on the user profile 136 and the characteristics of message 120, such as message type or time sent, the system 100 may perform one of the four combinations of actions. For example, suppose the system 100 receives a message 120 destined for mobile device 170 which matches the criteria for a paging rule that requires the system 100 to activate-discard. In response, system 100 would activate mobile device 170 and discard message 120. A higher layer protocol, such as Transmission Control Protocol, SMS, or IRC, may require the sender to resend message 120 when no response is received. In this case, having received no response because the message 120 was discarded, the sender may resend message 120. During the time the sender was waiting for a response and resending the message 120, mobile device 170 may have become active. Thus, when the resent message 120 arrives, it may be transmitted to an active mobile device 170.

As a result, paging rules could take many forms. For example, a paging rule may be to activate mobile device 170 and buffer the message 120 for all SMTP messages sent during normal business hours. Another example may be to activate mobile device 170 and discard the message 120 for all SIP messages sent from myjob.com. Yet another example paging rule may be to allow the mobile device 170 to remain idle and to buffer all SMTP messages until a certain number of SMTP messages are stored and then to activate the mobile device 170. Another example paging rule may be to allow the mobile device 170 to remain idle and to discard the message 120 for all IRC messages sent after a certain time. Numerous combinations of criteria exist and may be utilized by the present invention.

Default rules 138 comprise a data structure containing one or more paging rules. As described above, paging rules are pre-defined criteria based on one or more characteristics of a message 120 used to determine whether to activate mobile device 170 when a message 120 is received from network 110. In some embodiments, as explained below, default rules 138 are used if the message 120 satisfies none of the criteria of paging rules stored in user profiles 136. As with user profiles 136, default rules 138 may be based on any number and combination of characteristics of message 120, including, but not limited to: the message type, the time sent, the message priority, and the maximum number of messages 120 buffered before transmitting to mobile device 170. Numerous combinations of criteria exist to create a number of possible default rules 138 that may be utilized by the present invention.

Queue 140 comprises a data structure which can buffer one or more messages 120. Messages 120 that are received but not immediately transmitted or discarded may be buffered in queue 140 for future transmission after the mobile device 170 for which buffered messages 120 are destined becomes active. A mobile device 170 that is idle should first be activated before messages 120 buffered in the queue 140 can be transmitted to the mobile device 170. Messages 120 may be purged from queue 140 after they have been transmitted to a mobile device 170.

AAA server 142 comprises a processor and a memory that stores user profiles 136 associated with users 180. AAA server 142 facilitates the authentication, authorization, and accounting of user 180 of mobile device 170 in a network environment. AAA server 142 handles requests by mobile device 170 for access to networking resources, such as any device, component, or element that provides some functionality to user 180 of mobile device 170 communicating in system 100. AAA server 142 is communicatively coupled to access gateway 130 and sends user profiles 136 to access gateway 130 when requested.

Relay device 150 comprises a queue 152 to buffer messages 120 and a processor 154 operable to receive and forward messages 120 and activation requests 194. Generally, relay device 150 acts as an intermediary between access gateway 130 and base station 160. Relay device 150 may forward to base station 160 activation requests 194 received from gateway 130. Relay device 150 may also buffer messages 120 for future transmission to an active mobile device 170. Messages 120 may be purged from queue 152 after they have been transmitted to a mobile device 170. Relay device 150 may be incorporated into base station 160 or operate to provide services that are redundant to a base station 160.

Base station 160 is a communicative interface that may comprise radio transmission/reception devices, components or objects, and antennas. Base station 160 may be communicatively coupled through wireless network 190 to any communications device or element, such as mobile devices 170. Base station 160 may also be coupled to access gateway 130 or a relay device 150. Base station 160 may operate as a series of complex radio modems where appropriate. Base station 160 may track mobile devices 170 in its range, communicate activation requests 194 to mobile devices 170 and transmit messages 120 to active mobile devices 170. Base station 160 may also incorporate portions or all of a relay device 150.

Mobile devices 170 may be any device which is capable of receiving packets wirelessly, including, but not limited to, laptops, PDAs, cell phones, and IP phones. Each mobile device 170 may be associated with a user 180. Mobile devices 170 have an idle state and an active state. The idle state typically is used to conserve the mobile device's battery life. While in an idle state, mobile device 170 may not receive messages 120, but may receive activation requests 194. Upon receiving a request 194, mobile device 170 transitions from an idle to an active state. When a mobile device 170 becomes active, system 100 may transmit to the active mobile device 170 some or all messages 120 that were buffered in queue 140 or queue 152 while the mobile device 170 was idle.

Wireless network 190 is a series of points or nodes of interconnected communication paths for receiving and transmitting packets of information that propagate through system 100. Wireless network 190 offers a communications interface between access gateway 130 and any number of selected components, such as base station 160 or relay device 150. Wireless network 190 may be any wireless packet-based communications network, including, but not limited to, a 3G packet-switched network, a WiFi/802.11x network, and a WiMax/802.16x network.

In operation, mobile device 170 sends a registration request 192 to base station 160 in order to register with wireless network 190. Base station 160 transmits the registration request 192 to access gateway 130. Access gateway 130 authenticates and registers mobile device 170 based on the registration request 192. In some embodiments, access gateway 130 retrieves from AAA server 142 user profiles 136 associated with user 180 of mobile device 170. After a mobile device 170 has registered with access gateway 130, access gateway 130 receives from network 110 and processes messages 120 that are destined for mobile device 170.

When a message 120 is received from network 110, access gateway 130 inspects message 120 for its destination address and determines whether mobile device 170, for which message 120 is destined, is idle. If mobile device 170 is active, gateway 130 transmits message 120 to mobile device 170 via base station 160. In some embodiments, gateway 130 forwards message 120 to relay device 150, which transmits message 120 to mobile device 170 via base station 160. If mobile device 170 is idle, however, access gateway 130 may perform additional processing to determine whether to activate a mobile device 170 or allow it to remain idle. First, access gateway 130 inspects message 120 for characteristics used to make this determination. During its inspection of message 120, access gateway 130 may determine the source and destination IP addresses, the message type, the time sent, and the message's urgency or priority. Some embodiments utilize an activate flag, which is a parameter that may be contained in a message 120. If the activate flag is set, access gateway 130 sends an activation request 194 to mobile device 170, buffers message 120 to be transmitted after mobile device 170 becomes active. In some embodiments, the relay device 150 buffers message 120 prior to transmission.

Using the destination address of message 120, access gateway 130 may access user profiles 136 of an associated user 180 to retrieve a paging rule whose criteria matches the characteristics of message 120. As explained above, paging rules are pre-defined criteria based on one or more characteristics of a message 120 used to determine whether to activate mobile device 170. Generally, the paging rules' criteria may relate to the message type, the time sent, the sender, the message priority, the number of low-priority messages stored before transmitting to mobile device 170, or any other characteristics of messages 120.

Paging rules may indicate that one of four actions should be performed. First, if the matching paging rule indicates that the mobile device 170 should be activated and that the incoming message 120 should be transmitted, then access gateway 130 may send an activation request 194 to mobile device 170 and may buffer message 120 in queue 140 to be transmitted to mobile device 170 after mobile device 170 becomes active. In some embodiments, an activation request 194 and message 120 may be forwarded to relay device 150, which in turn may forward the activation request 194 to base station 160 and may buffer message 120 for transmission after mobile device 170 becomes active. Second, if the matching paging rule indicates that mobile device 170 should remain idle and that message 120 should be stored for later transmission to mobile device 170, access gateway 130 may buffer message 120 in queue 140 without sending an activation request 194 to mobile device 170. In some embodiments, access gateway 130 may forward message 120 to relay device 150 to be stored for future transmission to mobile device 170. Third, if the matching paging rule indicates that the mobile device 170 should be activated and that the incoming message 120 should be discarded, then access gateway 130 may send an activation request 194 to mobile device 170 and may discard message 120. In this case, the higher layer protocol used to send message 120 across the network 110 may require the sender to resend message 120. The re-sent message 120 may be transmitted to mobile device 170 if the device has become active by the time the re-sent message 120 reaches access gateway 130. Fourth, if the matching paging rule indicates that the mobile device 170 should remain idle and that the incoming message 120 should be discarded, then access gateway 130 may discard message 120 without sending an activation request 194 to mobile device 170.

If no matching paging rules in user profiles 136 exists for the given destination address and characteristics of message 120, access gateway 130 may access default rules 138. Access gateway 130 may retrieve an appropriate paging rule stored in default rules 138 based on the characteristics of message 120. Based on the paging rule retrieved from default rules 138, access gateway 130 may: (1) send an activation request 194 to mobile device 170 and buffer message 120 in queue 140 for transmission to mobile device 170 after mobile device 170 becomes active; (2) buffer message 120 in queue 140 without sending an activation request 194 to mobile device 170; (3) send an activation request 194 to mobile device 170 and discard message 120; or (4) discard message 120 without sending an activation request 194 to mobile device 170. Some embodiments utilize relay device 150 instead of queue 140.

An idle mobile device 170 that receives an activation request 194 may transition from an idle to an active state. When mobile device 170 becomes active, system 100 may transmit some or all messages 120 buffered while mobile device 170 was idle. In some embodiments, after the buffered messages 120 are transmitted, they may be purged from queue 140 or queue 152 or may be marked as transmitted to prevent duplicate transmissions of messages 120.

FIG. 2 illustrates one embodiment of user profiles 136 formatted in a table in accordance with system 100. Each record 200 of user profiles 136 represents a paging rule that may be associated with a particular mobile device 170, or, in some embodiments, associated with a particular user 180. In general, system 100 compares the characteristics of message 120 with the records 200 of user profile 136 to find a matching paging rule. Upon finding a match, the information stored in the matching record 200 directs system 100 to perform certain actions, such as activating mobile device 170, transmitting message 120, or discarding message 120. The table of user profiles 136 may comprise a number of columns representing the various characteristics of a message 120 by which to determine whether to activate mobile device 170 and whether to transmit, buffer, or discard message 120.

The identifier column 210 contains the identification of mobile device 170 or, in some embodiments, user 180. This identification could be any series of characters that uniquely identify each mobile device 170 or user 180 in system 100, including, but not limited to, the destination IP address of mobile device 170. For example, record 200a has an example IP address, "207.142.131.235," stored in the identification column 210. In addition to IP address, the identifier column 210 may also contain a Media Access Control (MAC) address, such as "01:23:45:67:89:ab." Any number or series of numbers or characters that uniquely identify mobile devices 170 in system 100 are contemplated for use in identifier column 210.

The criteria columns 220 are used to match predetermined criteria with the characteristics of message 120. When there is a match, system 100 performs actions based on the action column 230. Criteria columns 220 are based on, but not limited to: the message type 220a, the time sent 220b, the sender 220c, the message priority 220d, and the maximum buffered messages 220e. The message type column 220a may be populated with one of several message types, such as: "SMTP," "SIP," "SMS," "IRC," or any other type of message sent over network 110. The time sent column 220b may be populated with time-related criteria, such as: "<1601," which means before 4:01 P.M.; or ">1600," which means after 4:00 P.M. The sender column 220c may include identifiers for an individual, a business entity or domain name, or an e-mail address. Example entries may include "John Doe," "myjob.com," and "supervisor@myjob.com." The message priority column 220d may be populated with "High," "Normal," "Low," or any other code that indicates the importance of the message to the sender. The maximum buffered messages column 220e may contain any positive integer and represents the maximum number of messages buffered before activating mobile device 170 so that some or all buffered messages 120 may be transmitted. Other criteria columns not specifically mentioned here are contemplated by system 100 and the above mentioned columns are in no way exhaustive, but are merely illustrative.

The action column 230 contains the action to be taken when the characteristics of message 120 satisfy criteria columns 210 and 220 of a particular record 200. The actions may be, for example, "activate-transmit," "activate-discard," "idle-buffer," or "idle-discard." "Activate-transmit" directs system 100 to activate mobile device 170 and to buffer message 120 for transmission after mobile device 170 becomes active. "Activate-discard" directs system 100 to activate mobile device 170 and to discard message 120 relying on the higher layer protocol to direct the sender to resend the message 120. "Idle-buffer" directs system 100 to allow mobile device 170 to remain idle, and to buffer message 120 for later transmission. "Idle-discard" directs system 100 to allow mobile device 170 to remain idle and to discard message 120.

In operation, system 100 uses user profiles 136 to store user profile data to determine whether to activate idle mobile device 170 and whether to buffer message 120. In one embodiment, system 100 receives and inspects message 120 and determines that it is destined for idle mobile device 170. System 100 then retrieves user profiles 136 associated with mobile device 170 and compares criteria columns 220 with the characteristics of message 120 to find a matching record 200. If a matching record 200 is found, system 100 performs the action contained in the matching record's 200 action column 230. If no matching record 200 is found then system 100 uses default rules 138 to determine the appropriate action to perform, as described in FIG. 1 and FIG. 3.

The following example illustrates the data access and manipulation that takes place when a message 120 is received from network 110 destined for a particular idle mobile device 170 and a particular user 180. Suppose an idle mobile device 170 has an IP address of "207.142.131.235," and message 120 is a "High" priority e-mail message from "supervisor@myjob.com" sent at 6:00 PM (1800 hours) destined for the idle mobile device 170. Suppose further that user profiles 136 are populated as shown in FIG. 2. System 100 receives and inspects message 120. System 100 then accesses user profiles 136 comparing the characteristics of message 120 described above with the records of user profiles 136. Records 200a, 200b, 200c, 200d, and 200e have values stored in their respective identifier columns 210 that match the destination IP address of message 120, but only records 200a, 200b, and 200c also match the message type of message 120 having "SMTP" stored in their respective message type column 220a. Record 200a has a value of "<1601" stored in its time sent column 220b, which disqualifies the message 120, sent at 6:00 P.M., from matching record 200a. Record 200c has a value of ">1600" stored in its time sent column 220b, but has "Low" stored in the priority column 220d. Because message 120 is "High" priority, it does not satisfy the criteria 220 of record 200c. The characteristics of message 120 satisfy all of the criteria 220 of record 200b. Record 200b requires that message 120 be an "SMTP" from "myjob.com" having a "High" priority, and has no constraints on the time the message was sent. Record 200b has "Activate-transmit" stored in its action column 220. As described above, "Activate-transmit" directs system 100 to activate mobile device 170 and to buffer message 120 for transmission after mobile device 170 becomes active. Accordingly, system 100 activates mobile device 170 and stores in queue 140 message 120 to be transmitted once mobile device 170 becomes active. Once active, mobile device 170 may receive the transmission of some or all of the messages 120 stored in queue 140. Some embodiments may use queue 152 instead of queue 140.

Another example illustrates one embodiment's use of the maximum queued messages column 220e. Suppose an SMS message sent at 3:00 PM (1500) destined for a mobile device 170 having an IP address of "207.142.131.222" is received by system 100. Using the data illustrated in FIG. 2, system 100 may retrieve record 200f. If the number of messages buffered in queue 140 is less than fifteen, then record 200f is not treated as a matching record, in which case the default rules 138 may apply. If the number of messages buffered in queue 140 is fifteen or more, then record 200f is treated as a matching record 200 and system 100 performs the action in action column 230, which is "Activate-transmit." System 100 may activate mobile device 170 and buffer in queue 140 message 120 to be transmitted once mobile device 170 becomes active. Once active, mobile device 170 may receive the transmission of some or all of the messages 120 buffered in queue 140 while mobile device 170 was idle. Some embodiments may use queue 152 instead of queue 140.

In the illustrated embodiment, user profiles 136 is a multi-dimensional data structure. But user profiles 136 may be arranged in any appropriate format. In this example, each cell of user profiles 136 includes data, pointers, references, or any other identifier of mobile devices 170 or users 180, action, message type, time sent, or sender. It will be understood that each cell of user profiles 136 may include none, some, or all of the example data. In one embodiment, each cell of user profiles 136 may include links, foreign keys, or pointers to another table. The rows and columns of user profiles 136 illustrated in FIG. 2 are merely exemplary and system 100 contemplates any other suitable rows and columns of user profiles 136 that allow system 100 to intelligently activate mobile device 170 and to selectively buffer messages 120. Moreover, user profiles 136 may be separated into multiple tables or files without departing from the scope of the invention.

FIG. 3 illustrates one example of default rules 138. Each record 300 of default rules 138 represents a default paging rule to be applied when no paging rule is found in user profiles 136 matching the characteristics of a particular message 120 destined for the particular mobile device 170. In general, system 100 compares the characteristics of message 120 with the records 300 of default rules 138 to find a matching default paging rule, which directs system 100 to perform certain actions, such as activating mobile device 170, transmitting message 120, or discarding message 120. Default rules 138 may comprise a number of columns representing the various characteristics of a message 120 by which to determine whether to activate a mobile device 170.

The criteria columns 310, are used to match predetermined criteria with the characteristics of message 120. When there is a match, then system 100 performs the action contained in the action column 320. Criteria columns 310 are based on, but not limited to: the message type 310a, the time sent 310b, the message priority 310c, and the maximum queued messages 310d. The message type column 310a may be populated with one of several message types, such as: "SMTP," "SIP," "SMS" "IRC," or any other type of message sent over network 110. The time sent column 320b may be populated with time-related criteria, such as: "<1400," or ">0800." The message priority column 310c may be populated with "High," "Normal," "Low," or any other code that indicates the importance of the message to the sender. Other criteria columns not specifically mentioned here are contemplated by system 100 and the above mentioned columns are in no way exhaustive, but are merely illustrative.

The action column 320 contains the action to be taken if the record matches the characteristics of message 120. The action column 320 is used to direct system 100 to take a certain action when the criteria columns 310 are satisfied. The actions may be, for example, "activate-transmit," "activate-discard," "idle-buffer," or "idle-discard," as described above.

In operation, system 100 uses default rules 138 to store data to determine whether to activate idle mobile device 170 and whether to buffer message 120. In one embodiment, system 100 receives and inspects message 120 and determines that it is destined for idle mobile device 170. System 100 then retrieves user profiles 136 associated with mobile device 170 and compares criteria columns 220 with the characteristics of message 120 to find a matching record 200. If a matching record 200 is found, system 100 performs the action contained in the action column 230 of the matching record 200, as described in FIG. 2. If no matching record 200 is found, then the gateway 130 uses default rules 138 to determine the appropriate action to perform.

The following example illustrates the data access and manipulation that takes place when a message 120 is received from network 110 destined for a particular idle mobile device 170 and a particular user 180 when no matching paging rule is found in user profiles 136. Recall the first example in FIG. 2 described above. Suppose the message priority of message 120 is changed from "High" to "Normal," which would produce no record 200 in user profiles 136 that matches the characteristics of message 120. Suppose further that default rules 138 are populated as illustrated in FIG. 3. System 100 receives and inspects message 120. System 100 then accesses user profiles 136 comparing the characteristics of message 120 described above with the records of user profiles 136. As stated, user profiles 136 yield no matching paging rule. As a result, system 100 accesses default rules 138 to determine the appropriate action to take with respect to mobile device 170.

Record 300a contains "SMTP" in the message type column 310a, "Normal" in priority column 310c, and no constraints in the other columns 310. The characteristics of message 120 satisfy the criteria 310 of record 300a. Record 300a contains "Idle-buffer" in the action column 320. As described above, "idle-buffer" directs system 100 to allow the mobile device 170 to remain idle and to buffer message 120 for later transmission after mobile device 170 becomes active. Accordingly, system 100 stores message 120 in queue 140 or queue 152 depending on the embodiment.

In the illustrated embodiment, default rules 138 is a multi-dimensional data structure. However, default rules 138 may be arranged in any appropriate format. In this example, each default rule 138 record 300 includes data, pointers, references, or any other identifiers of the message type, time sent, and the action. It will be understood that each default rules 138 record may include none, some, or all of the example data. In one embodiment, each default rules 138 row may include links, foreign keys, or pointers to another table. The data illustrated in default rules 138 are merely exemplary and system 100 contemplates any other suitable data that allows system 100 to intelligently activate mobile device 170 and selectively buffer messages 120. Moreover, default rules 138 may be separated into multiple tables or files without departing from the scope of the invention.

Figure 4:
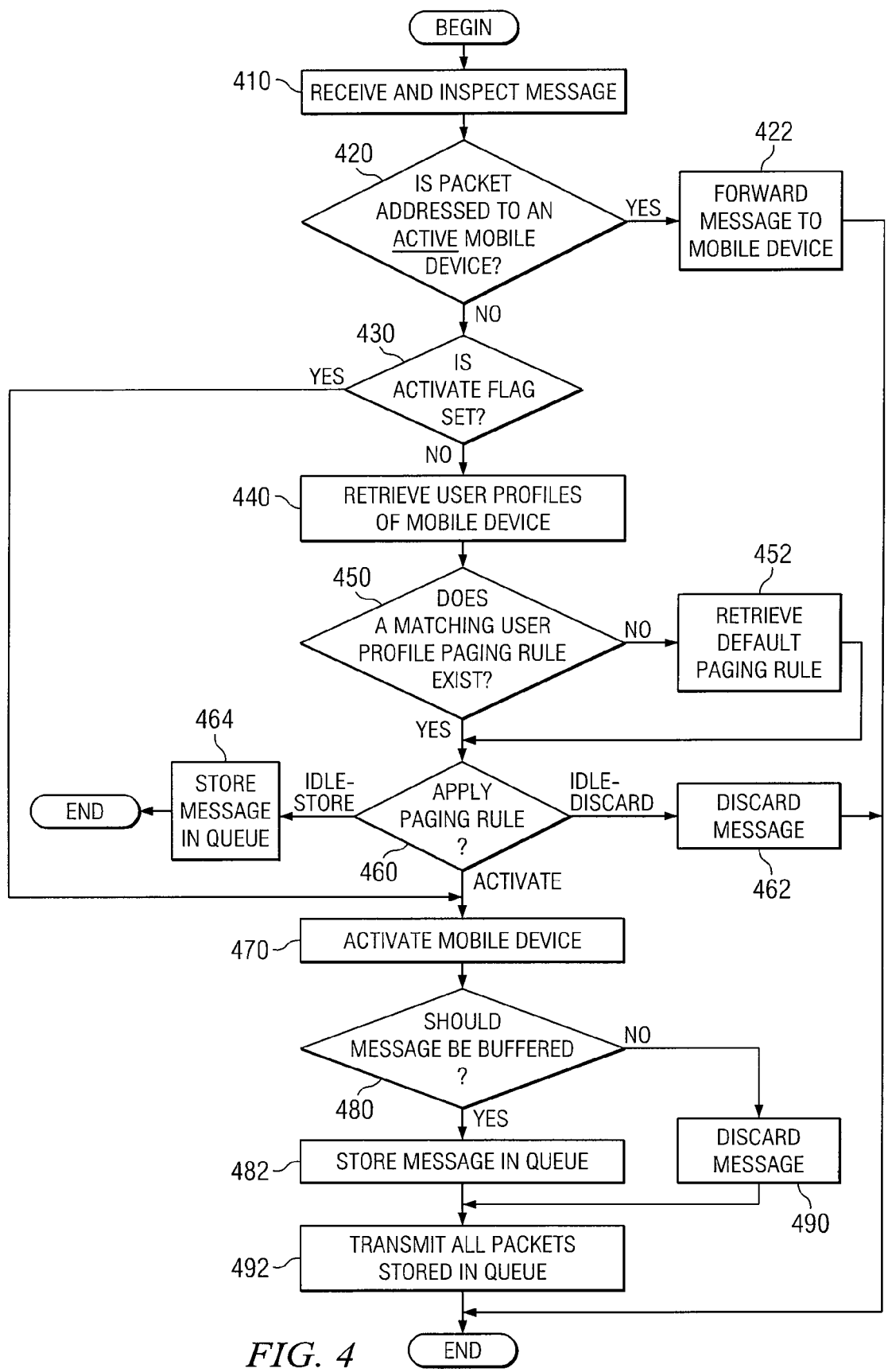
FIG. 4 illustrates on embodiment of intelligently requesting a mobile device to transition to an active state.

FIG. 4 is a flowchart illustrating an example method 400 for various aspects of intelligently activating mobile device 170. At a high level, method 400 describes the process by which message 120 may be received and inspected, and by which mobile device 170 may be intelligently activated, based on the inspection, user profiles 136, and default rules 138. Although the following descriptions focus on the operation of particular components of system 100 in performing method 400, system 100 contemplates using any appropriate combination and arrangement of logical elements to implement some or all of the described functionality and techniques.

Method 400 begins at step 410 when message 120 is received from network 110. At step 410, system 100 receives and inspects message 120 for its various characteristics. Some of the characteristics determined as a result of inspecting message 120 may include: the destination address of message 120, the time message 120 was sent, the sender of message 120, the priority set by the sender of message 120, and whether the activate flag is set. The characteristics inspected may depend on the protocol used by network 110 to send data. For example, for messages 120 that conform to IPv6 protocol, system 100 may inspect the flow labels or the authentication headers. In a VPN, for example, system 100 may inspect the message 120 for a destination VPN identification or a unique interface identification. Additionally, system 100 may inspect any imbedded content that could be used in comparing criteria columns 220 of user profiles 136 and criteria columns 310 of default rules 138. These examples in no way limit the amount of information or the number of fields that system 100 may inspect.

After receiving and inspecting message 120, at step 420, system 100 determines whether mobile device 170 is active or idle. If the mobile device is active, method 400 proceeds to step 422, where the message 120 is transmitted to the mobile device 170, after which the method 400 ends. If the mobile device is idle, method 400 proceeds to step 430, where system 100 may determine whether the message 120 contains an activate flag that is set. If the activate flag is set, system 100 proceeds to step 470, which is discussed in detail later.

If the activate flag is not set, system 100, at step 440, retrieves user profiles 136 for mobile device 170. At step 450, system 100 determines whether the characteristics of message 120 satisfy the criteria of any paging rule stored in user profiles 136. If a match is found, the method 400 proceeds to step 460. If no match is found, the method proceeds to step 452, where system 100 finds the matching default paging rule in default rules 138 whose criteria the characteristics of message 120 satisfy. Method 400 then proceeds to step 460.

At step 460, system 100 determines the action to be performed based on the paging rule found in step 450 or step 452. If the paging rule indicates that the mobile device 170 should remain idle and that the message 120 should be discarded, then, at step 462, message 120 is discarded and method 400 ends. If the paging rule indicates that the mobile device 170 should remain idle and that the message 120 should be stored without activating mobile device 170, then, at step 464, message 120 is stored in a queue 140 or 152 for later transmission and method 400 ends. If the paging rule indicates that mobile device 170 should be activated, method 400 proceeds to step 470.

At step 470, a request 194 is sent to activate mobile device 170. At step 480, system 100 determines whether message 120 should be buffered or discarded according to the paging rule. If the message 120 should be discarded, then execution proceeds to step 490. If the message 120 should be buffered, then method 400 proceeds to step 482 where the message 120 is stored in a queue 140 or 152 for transmission to mobile device 170.

Step 492 is executed after the mobile device 170 becomes active. At step 492, some or all of the messages 120 buffered for transmission to mobile device 170 are transmitted to mobile device 170. After executing step 492, method 400 ends.

System 100 may perform steps not shown in FIG. 4. Likewise, system 100 may omit steps or perform steps in an order different from those shown in FIG. 4 while still being contemplated by the present invention. Method 400 is merely one embodiment of the claimed invention.

Numerous other changes, substitutions, variations, alterations, and modifications may be ascertained by those skilled in the art and it is intended that the present invention encompass all such changes, substitutions, variations, alterations, and modifications as falling within the spirit and scope of the appended claims. Moreover, the present invention is not intended to be limited in any way by any statement in the specification that is not otherwise reflected in the appended claims.

What is claimed is:

1. A method for intelligently paging an idle mobile device, the method comprising:
   receiving a message at a processor, the message destined for a mobile device communicatively coupled to a packet switched wireless network;
   determining a plurality of characteristics of the message, including a destination address of the message;
   retrieving at least one paging rule based at least in part upon the destination address of the message;
   applying the at least one paging rule;
   allowing the mobile device to remain in an idle state in response to the at least one paging rule if the at least one paging rule comprises an instruction to allow the mobile device to remain in an idle state;
   requesting the mobile device to transition to an active state in response to the at least one paging rule if the at least one paging rule comprises an instruction to request the mobile device to transition to an active state;
   communicating the message to the mobile device in response to the at least one paging rule if the at least one paging rule comprises an instruction to request the mobile device to transition to an active state; and
   wherein at least one of the plurality of characteristics is of the set comprising:
      the sender of the incoming message;
      the time the incoming message was sent;
      the protocol used to transmit the incoming message;
      the priority of the incoming message; and
      an activation flag being set in the incoming message.

2. The method of claim 1, wherein the at least one paging rule is specific to the mobile device.

3. The method of claim 1, wherein the at least one paging rule is a default rule applicable to a plurality of mobile devices.

4. The method of claim 1, wherein the step of retrieving the at least one paging rule comprises:
   retrieving from a plurality of paging rules specific to the mobile device a particular paging rule having criteria that match the plurality of characteristics of the message; and
   retrieving from a plurality of default rules a particular default rule having criteria that match the plurality of characteristics of the message, if the plurality of paging rules specific to the mobile device contains no particular paging rule having criteria that match the plurality of characteristics of the message.

5. The method of claim 1, the method further comprising:
   buffering the message if instructed by the at least one paging rule.

6. The method of claim 1, the method further comprising:
discarding the message if instructed by the at least one paging rule.

7. The method of claim 5, wherein the step of retrieving the at least one paging rule is based on the number of messages destined for the mobile device that are buffered.

8. The method of claim 5, further comprising:
transmitting to the mobile device after it becomes active at least a portion of the messages destined for the mobile device that are buffered.

9. The method of claim 1, wherein the message comprises a plurality of packets.

10. An access gateway comprising:
a memory capable of storing a plurality of paging rules and one or more messages destined for a mobile device; and
a processor operable to:
receive a message destined for a mobile device communicatively coupled to a packet switched wireless network;
determine a plurality of characteristics of the message, including a destination address of the message;
retrieve at least one paging rule based at least in part upon the destination address of the message;
apply the at least one paging rule;
allow the mobile device to remain in an idle state in response to the at least one paging rule if the at least one paging rule comprises an instruction to allow the mobile device to remain in an idle state;
request the mobile device to transition to an active state in response to the at least one paging rule if the at least one paging rule comprises an instruction to request the mobile device to transition to an active state;
communicate the message to the mobile device in response to the at least one paging rule if the at least one paging rule comprises an instruction to request the mobile device to transition to an active state; and
wherein at least one of the plurality of characteristics is of the set comprising:
the sender of the incoming message;
the time the incoming message was sent;
the protocol used to transmit the incoming message;
the priority of the incoming message; and
an activation flag being set in the incoming message.

11. The access gateway according to claim 10, wherein the processor is further operable to:
retrieve from a plurality of paging rules specific to the mobile device a particular paging rule having criteria that match the plurality of characteristics of the message;
retrieve from a plurality of default rules a particular default rule having criteria that match the plurality of characteristics of the message, if the plurality of paging rules specific to the mobile device contains no particular paging rule having criteria that match the plurality of characteristics of the message.

12. The access gateway according to claim 10, wherein the processor is further operable to buffer the message in the memory if instructed by the at least one paging rule.

13. The access gateway according to claim 10, wherein the processor is further operable to discard the message if instructed by the at least one paging rule.

14. The access gateway according to claim 12, wherein the processor is further operable to transmit to the mobile device when the mobile device becomes active at least a portion of the messages destined for the mobile device that are buffered.

15. The access gateway according to claim 10, wherein the processor is further operable to host an application proxy, wherein the application proxy is operable to:
receive a message destined for a mobile device communicatively coupled to a packet switched wireless network;
determine a plurality of characteristics of the message, including a destination address of the message;
retrieve from a plurality of paging rules specific to the mobile device a particular paging rule having criteria that match the plurality of characteristics of the message;
retrieve from a plurality of default rules a particular default rule having criteria that match the plurality of characteristics of the message, if the plurality of paging rules specific to the mobile device contains no particular paging rule having criteria that match the plurality of characteristics of the message.

16. A system comprising a mobile device, an access gateway, a base station, and means for buffering a message destined for the mobile device,
the access gateway operable to:
receive the message destined for a mobile device communicatively coupled to a packet switched wireless network;
determine a plurality of characteristics of the message, including a destination address of the message;
retrieve at least one paging rule, based at least in part upon the destination address, wherein retrieving the at least one paging rule comprises:
retrieving from a plurality of paging rules specific to the mobile device a particular paging rule having criteria that match the plurality of characteristics of the message; and
retrieving from a plurality of default rules a particular default rule having criteria that match the plurality of characteristics of the message, if the plurality of paging rules specific to the mobile device contains no particular paging rule having criteria that match the plurality of characteristics of the message;
apply the at least one paging rule;
allow the mobile device to remain in an idle state in response to the at least one paging rule if the at least one paging rule comprises an instruction to allow the mobile device to remain in an idle state; and
send a first request to transition the mobile device to an active state in response to the at least one paging rule if the at least one paging rule comprises an instruction to request the mobile device to transition to an active state;
send a third request to communicate the message to the mobile device in response to the at least one paging rule if the at least one paging rule comprises an instruction to request the mobile device to transition to an active state; and
the base station communicatively coupled to the access gateway and the mobile device, the base station operable to:
receive the first request; and
send a second request to the mobile device to transition the mobile device to an active state.

17. The system according to claim 16, further comprising an authentication, authorization, and accounting server operable to store one or more paging rules specified for the mobile device.

18. The system according to claim 16, wherein the means for buffering the incoming message is a relay device.

* * * * *